US011531525B2

(12) United States Patent
Ayyalasomayajula et al.

(10) Patent No.: US 11,531,525 B2
(45) Date of Patent: Dec. 20, 2022

(54) SYSTEM AND METHOD FOR PACKAGING STANDALONE APPLICATION MODULES INTO RE-USABLE APPLICATION AND INFRASTRUCTURE RESOURCES

(71) Applicant: JPMorgan Chase Bank, N.A., New York, NY (US)

(72) Inventors: Sudheendra Ayyalasomayajula, Coatesville, PA (US); Raghuram Vudathu, Downingtown, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 60 days.

(21) Appl. No.: 17/238,800

(22) Filed: Apr. 23, 2021

(65) Prior Publication Data

US 2022/0342646 A1    Oct. 27, 2022

(51) Int. Cl.
*G06F 8/36*    (2018.01)

(52) U.S. Cl.
CPC ..................... *G06F 8/36* (2013.01)

(58) Field of Classification Search
None
See application file for complete search history.

(56) References Cited

U.S. PATENT DOCUMENTS

| | | | | |
|---|---|---|---|---|
| 2002/0198675 A1* | 12/2002 | Underseth | ........... | G06F 11/3636 702/108 |
| 2020/0192727 A1* | 6/2020 | Savenkov | ............... | G06F 9/547 |
| 2020/0257700 A1 | 8/2020 | Xu et al. | | |
| 2021/0240549 A1* | 8/2021 | Park | .......................... | G06F 8/35 |
| 2022/0019413 A1* | 1/2022 | Krishnamoorthy | ....... | G06F 8/36 |

OTHER PUBLICATIONS

Aversano, "Introducing Workflow Management in Software Maintenance Processes", 2002, IEEE (Year: 2002).*
Official Communication Received in PCT Application No. PCT/US2022/25777, dated Sep. 1, 2022.

* cited by examiner

*Primary Examiner* — Hossain M Morshed
(74) *Attorney, Agent, or Firm* — Greenblum & Bernstein, P.L.C.

(57) ABSTRACT

Various methods, apparatuses/systems, and media for implementing a language agnostic packaging platform are disclosed. A receiver receives a user request of a process flow corresponding to develop, test, or manage a desired application. A data source stores ready to use modules written for corresponding application programming interface (API) for a plurality of resources. A processor coupled to the receiver and the data source accesses the data source to obtain the ready to use modules written for corresponding application programming interface (API) for the plurality of resources to determine what resources are necessary to develop, test, or manage the desired application and creates an index file based on the resources accessed from the data source. The processor also causes a language agnostic packaging platform to receive the index file as input and automatically creates the desired application as output of the process flow based on the received index file.

20 Claims, 11 Drawing Sheets

```
{
  "api-name": "Product Information API",
  "api": "POST",
  "dependencies": ["dependency1.json", "dependency2.json"],
  "url": "https://serrano-mocks.apps.dev.na-3h.gaia.jpmchase.net/api2",
  "headers": {
    "header-key-1": "${request.body.value}",
    "header-key-2": "${dependency2.body.output}"
  },
  "body": {
    "message": "hello"
  },
  "pre-condition": [{
    "value1": "{dependency1.body.output}", "condition": ">", "value2": "{dependency2.body.output}"},
    {"value1": "{dependency2.body.output}", "condition": "<", "value2": "{dependency1.body.output}"}],
  "post-process": {
    "API-OUTPUT": "Api-Output",
    "card_no": "card-number"
  },
  "retry": "9"
}
```

```
"/some-api": {
    "api": "POST",
    "processes": [
        [
            "a.json",
            "b.json"
        ],
        [
            "epv.json"
        ],
        [
            "c.json"
        ],
        [
            "db-read.json"
        ],
        [
            "db-write.json",
            "db-update.json"
        ]
    ],
    "post-process": {
        "result": "You can try using this token: ${ad.body.access_token}"
    }
},
```

FIG. 8

SYSTEM AND METHOD FOR PACKAGING STANDALONE APPLICATION MODULES INTO RE-USABLE APPLICATION AND INFRASTRUCTURE RESOURCES

TECHNICAL FIELD

This disclosure generally relates to application and infrastructure resources, and, more particularly, to methods and apparatuses for implementing a language agnostic packaging module for packaging standalone application modules into re-usable application and infrastructure resources.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Applications typically require infrastructure resources such as databases, message queues, etc. in order to function. Typically, these infrastructure resources need to be provided at the time of application startup. Modern applications may need to access a number of infrastructure resources in order to provide useful functionality. However, conventional techniques of coupling these infrastructure resources into a main application logic may prove to complicate architecture due to growing concerns with maintaining both the technical details such as resource availability/maintenance as well as business logic.

For example, today by utilizing conventional tools, an application developer may need to write a numerous amount of application code in order to get an application programming interface (API) working. Often, most of this application code may be repetitive, such as connecting to a database, making a REST API or SOAP (Simple Object Access Protocol) call, sending a message via MQ (Message Queue) or other messaging platform (e.g., Kafka), etc. In addition, connecting to these resources typically includes a very complex process and a major challenge in development and maintenance (future enhancements) of an application. The following is a non-exhaustive shortcomings of conventional workflow management tools: typically, application is written specifically to support the conventions of the workflow management tools; typically work with an inflexible GUI; typically need dedicated software running independently on the server; typically need to test a huge process at once; typically not conducive to agile methodology as small changes can have ripple effects; typically requires dedicated training and expertise to use effectively; typically does not support integration/performance testing; typically need custom deployment process in order to ensure security standards are met; typically locked into vendor's upgrade cycle, etc.

Thus, there is a need for an advanced workflow management tool that can address these conventional shortcomings.

SUMMARY

The present disclosure, through one or more of its various aspects, embodiments, and/or specific features or sub-components, provides, among other features, various systems, servers, devices, methods, media, programs, and platforms for implementing a language agnostic packaging module for packaging standalone application modules into re-usable application and infrastructure resources, but the disclosure is not limited thereto. For example, the various aspects, embodiments, features, and/or sub-components may also provide optimized processes of implementing a language agnostic packaging module for separating each of these application and infrastructure resource components into a configuration, which can be linked together by the language agnostic packaging module to allow for consistent easy orchestration and passing of data through the components to output a desired result. Since the disclosed process, according to exemplary embodiments, is language agnostic, the packaging module/platform may be independently tuned or modified for optimal performance without affecting the configuration files, thereby allowing full backward compatibility and minimizing overhead for development teams and allowing automated development and testing of an application without requiring to write any code. The configuration files, according to exemplary embodiments, may be written using JSON, but the disclosure is not limited thereto. For example, the configuration files can easily be extended to other readable file formats such as XML, YAML, etc., or any other configuration based languages.

According to an aspect of the present disclosure, a method for implementing a language agnostic packaging module by utilizing one or more processors and one or more memories is disclosed. The method may include: receiving a user request of a process flow corresponding to develop, test, or manage a desired application; accessing a data source that stores ready to use modules written for corresponding application programming interface (API) for a plurality of resources to determine what resources are necessary to develop, test, or manage the desired application; creating an index file based on the resources accessed from the data source that are determined to be necessary to develop, test, or manage the desired application, wherein the index file includes details data of how an API is executed; causing a language agnostic packaging platform to receive the index file as input that utilizes the index file to process the user request of the process flow corresponding to develop, test, or manage the desired application; and automatically creating, by the language agnostic packaging platform, the desired application as output of the process flow based on the received index file.

According to yet another aspect of the instant disclosure, the method may further include: creating the index file in any one of the following file formats: index.json, index.xml, and index.yml, but the disclosure is not limited thereto.

According to a further aspect of the instant disclosure, wherein the ready to use modules include one or more of the following modules: a REST (Representational State Transfer) connector module configured to process connectivity to REST APIs, a SOAP (Simple Object Access Protocol) connector module configured to process connectivity to SOAP APIs, a Cassandra connector module, a Kafka connector module, a relational database connector module, and a configuration file reader configured to read the index file in various formats, but the disclosure is not limited thereto.

According to an additional aspect of the instant disclosure, the method may further include implementing a request mapper module configured to manipulate the received user request with available values.

According to yet another aspect of the instant disclosure, the method may further include implementing a response mapper module configured to rearrange the output of the process flow in a desired manner.

According to yet another aspect of the instant disclosure, the method may further include altering the output of the process flow for a given resource.

According to a further aspect of the instant disclosure, the method may further include implementing a custom hook module within the index file; deviating, in response to implementing the custom hook, from the process flow to execute a desired custom code corresponding to develop, test, or manage the desired application; and returning back to the process flow after execution of the custom code.

According to a further aspect of the instant disclosure, wherein each resource may include its own meta-data file that describes how to consume the resource.

According to another aspect of the instant disclosure, a system for implementing a language agnostic packaging platform is disclosed. The system may include: a receiver that receives a user request of a process flow corresponding to develop, test, or manage a desired application; a data source that stores ready to use modules written for corresponding application programming interface (API) for a plurality of resources; and a processor coupled to the receiver and the data source via a communication network, wherein the processor may be configured to: access the data source to obtain the ready to use modules written for corresponding application programming interface (API) for the plurality of resources to determine what resources are necessary to develop, test, or manage the desired application; create an index file based on the resources accessed from the data source that are determined to be necessary to develop, test, or manage the desired application, wherein the index file includes details data of how an API is executed; cause a language agnostic packaging platform to receive the index file as input that utilizes the index file to process the user request of the process flow corresponding to develop, test, or manage the desired application; and automatically create, by the language agnostic packaging platform, the desired application as output of the process flow based on the received index file.

According to yet another aspect of the instant disclosure, the processor may be further configured to create the index file in any one of the following file formats: index.json, index.xml, and index.yml, but the disclosure is not limited thereto.

According to a further aspect of the instant disclosure, the processor may be further configured to implement: a REST (Representational State Transfer) connector module configured to process connectivity to REST APIs, a SOAP (Simple Object Access Protocol) connector module configured to process connectivity to SOAP APIs, a Cassandra connector module, a Kafka connector module, a relational database connector module, a configuration file reader configured to read the index file in various formats, a request mapper module configured to manipulate the received user request with available values, a response mapper module configured to rearrange the output of the process flow in a desired manner and alter the output of the process flow for a given resource.

According to yet another aspect of the instant disclosure, the processor may be further configured to implement a custom hook module within the index file; deviate, in response to implementing the custom hook, from the process flow to execute a desired custom code corresponding to develop, test, or manage the desired application; and return back to the process flow after execution of the custom code.

According to yet another aspect of the present disclosure, a non-transitory computer readable medium configured to store instructions for implementing a language agnostic packaging platform is disclosed. The instructions, when executed, cause a processor to perform the following: causing a receiver to receive a user request of a process flow corresponding to develop, test, or manage a desired application; accessing a data source that stores ready to use modules written for corresponding application programming interface (API) for a plurality of resources to determine what resources are necessary to develop, test, or manage the desired application; creating an index file based on the resources accessed from the data source that are determined to be necessary to develop, test, or manage the desired application, wherein the index file includes details data of how an API is executed; causing a language agnostic packaging platform to receive the index file as input that utilizes the index file to process the user request of the process flow corresponding to develop, test, or manage the desired application; and automatically creating, by the language agnostic packaging platform, the desired application as output of the process flow based on the received index file.

According to an additional aspect of the instant disclosure, wherein, when executed, the instructions may further cause the processor to perform the following: creating the index file in any one of the following file format: index.json, index.xml, and index.yml, but the disclosure is not limited thereto.

According to a further aspect of the instant disclosure, wherein, when executed, the instructions may further cause the processor to perform the following: implementing a REST (Representational State Transfer) connector module configured to process connectivity to REST APIs, implementing a SOAP (Simple Object Access Protocol) connector module configured to process connectivity to SOAP APIs, implementing a Cassandra connector module, implementing a Kafka connector module, implementing a relational database connector module, implementing a configuration file reader configured to read the index file in various formats, implementing a request mapper module configured to manipulate the received user request with available values, implementing a response mapper module configured to rearrange the output of the process flow in a desired manner and alter the output of the process flow for a given resource.

According to yet another aspect of the instant disclosure, wherein, when executed, the instructions may further cause the processor to perform the following: implementing a custom hook module within the index file; deviating, in response to implementing the custom hook, from the process flow to execute a desired custom code corresponding to develop, test, or manage the desired application; and returning back to the process flow after execution of the custom code.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 7 illustrates an exemplary metadata file created by utilizing a language agnostic packaging module of FIG. 4 in accordance with an exemplary embodiment.

FIG. 8 illustrates an exemplary index file created by utilizing a language agnostic packaging module of FIG. 4 in accordance with an exemplary embodiment.

DETAILED DESCRIPTION

Figure 1:
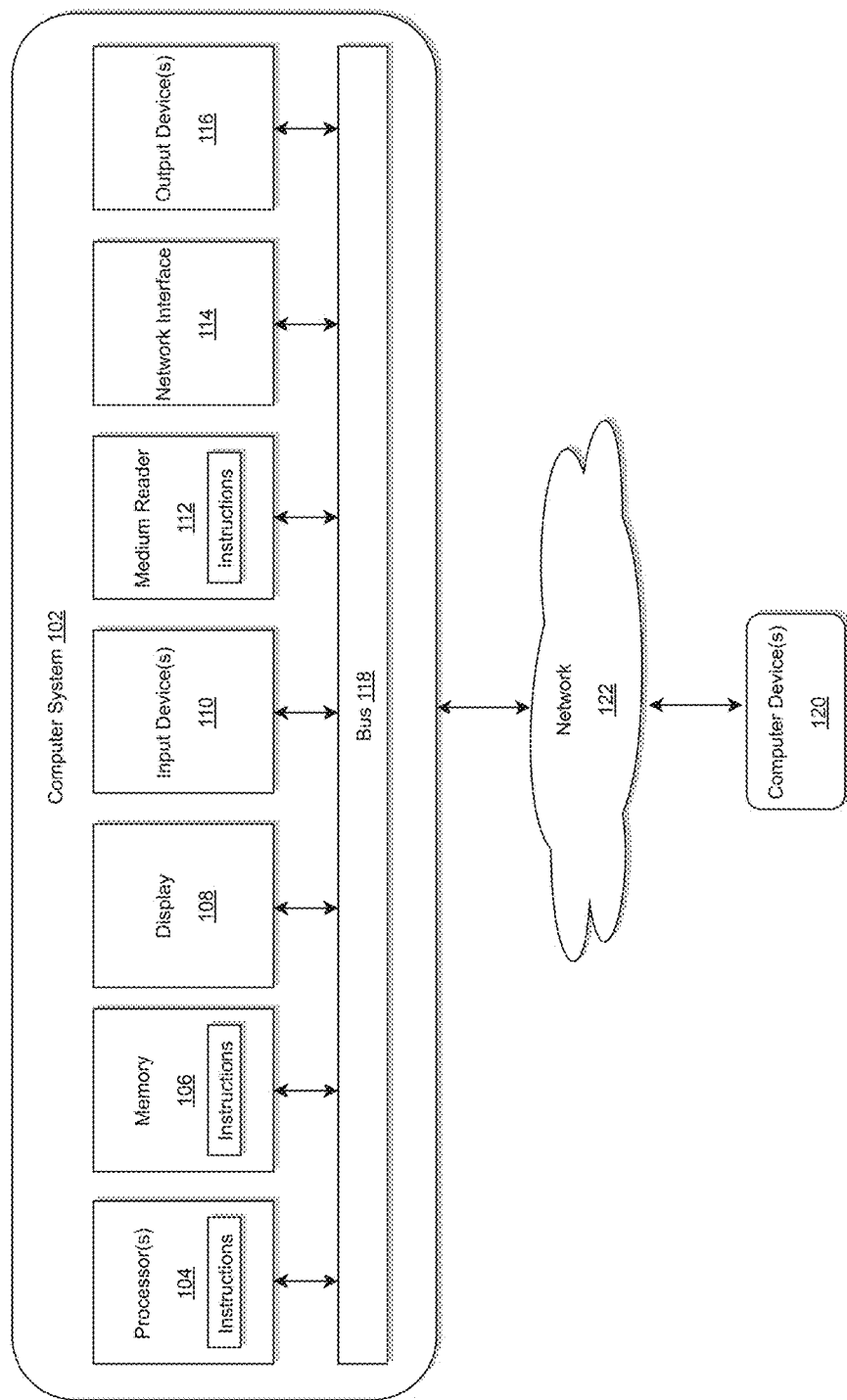
FIG. 1 illustrates a computer system for implementing a language agnostic packaging module that provides a platform for packaging standalone application modules into re-usable application and infrastructure resources in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in implementing a language agnostic packaging module that provides a platform for packaging standalone application modules into re-usable application and infrastructure resources in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, bluray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
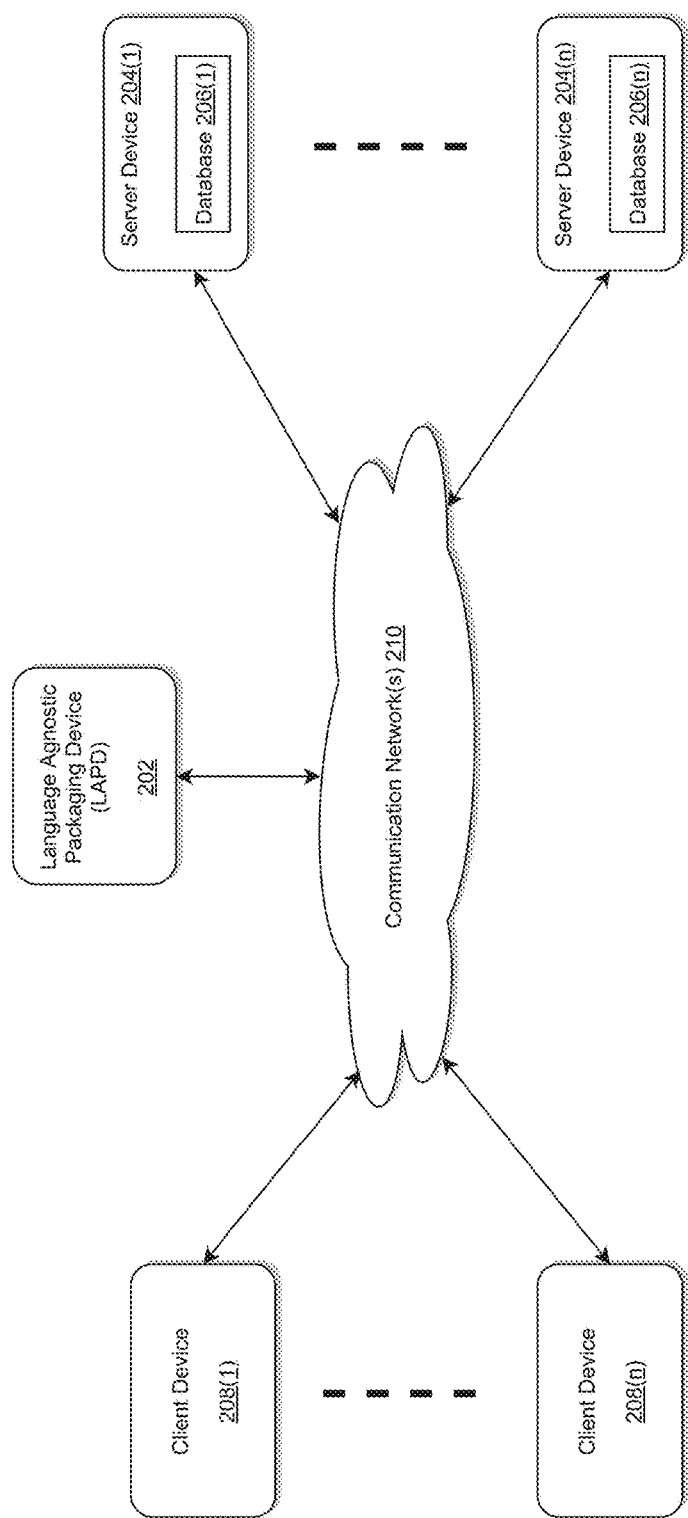
FIG. 2 illustrates an exemplary diagram of a network environment with a language agnostic packaging device in accordance with an exemplary embodiment.

Referring to FIG. 2, a schematic of an exemplary network environment 200 for implementing a language agnostic packaging device (LAPD) of the instant disclosure is illustrated.

According to exemplary embodiments, the above-described problems associated with conventional approach of developing, testing, or managing software application may be overcome by implementing an LAPD 202 as illustrated in FIG. 2 that may provide a platform for packaging standalone application modules into re-usable application and infrastructure resources, but the disclosure is not limited thereto. For example, the LAPD 202 may also provide optimized processes of implementing a language agnostic packaging module for separating each of these application and infrastructure resource components into a configuration, which can be linked together by the language agnostic packaging module to allow for consistent easy orchestration and passing of data through the components to output a desired result. Since the disclosed process, according to exemplary embodiments, is language agnostic, the language agnostic packaging module/platform may be independently tuned or modified for optimal performance without affecting the configuration files, thereby allowing full backward compatibility and minimizing overhead for development teams and allowing automated development and testing of an application without requiring to write any code. The configuration files, according to exemplary embodiments, may be written using JSON, but the disclosure is not limited thereto. For example, the configuration files can easily be extended to other readable file formats such as XML, YAML, etc., or any other configuration based languages.

The LAPD 202 may be the same or similar to the computer system 102 as described with respect to FIG. 1.

The LAPD 202 may store one or more applications that can include executable instructions that, when executed by the LAPD 202, cause the LAPD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the LAPD 202 itself, may be located in virtual server(s) running in a cloud-based computing environment rather than being tied to one or more specific physical network computing devices. Also, the application(s) may be running in one or more virtual machines (VMs) executing on the LAPD 202. Additionally, in one or more embodiments of this technology, virtual machine(s) running on the LAPD 202 may be managed or supervised by a hypervisor.

In the network environment 200 of FIG. 2, the LAPD 202 is coupled to a plurality of server devices 204(1)-204(n) that hosts a plurality of databases 206(1)-206(n), and also to a plurality of client devices 208(1)-208(n) via communication network(s) 210. A communication interface of the LAPD 202, such as the network interface 114 of the computer system 102 of FIG. 1, operatively couples and communicates between the LAPD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the LAPD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The LAPD 202 may be a standalone device or integrated with one or more other devices or apparatuses, such as one or more of the server devices 204(1)-204(n), for example. In one particular example, the LAPD 202 may be hosted by one of the server devices 204(1)-204(n), and other arrangements are also possible. Moreover, one or more of the devices of the LAPD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the LAPD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n).

Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the LAPD 202 that may efficiently provide a platform for packaging standalone application modules into re-usable application and infrastructure resources, but the disclosure is not limited thereto. For example, the client devices 208(1)-208(n) in this example may include any type of computing device that can facilitate the implementation of the LAPD 202 that may efficiently provide a platform for separating each of these application and infrastructure resource components into a configuration, which can be linked together by the language agnostic packaging module to allow for consistent easy orchestration and passing of data through the components to output a desired result.

The client devices 208(1)-208(n) may run interface applications, such as standard web browsers or standalone client applications, which may provide an interface to communicate with the LAPD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the LAPD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the LAPD 202, the server devices 204(1)-204(n), or the client devices 208(1)-208(n), for example, may be configured to operate as virtual instances on the same physical machine. For example, one or more of the LAPD 202, the server devices 204(1)-204(n), or the client devices 208(1)-208(n) may operate on the same physical device rather than as separate devices communicating through communication network(s) 210. Additionally, there may be more or fewer LAPDs 202, server devices 204(1)-204(n), or client devices 208(1)-208(n) than illustrated in FIG. 2. According to exemplary embodiments, the LAPD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interlace mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
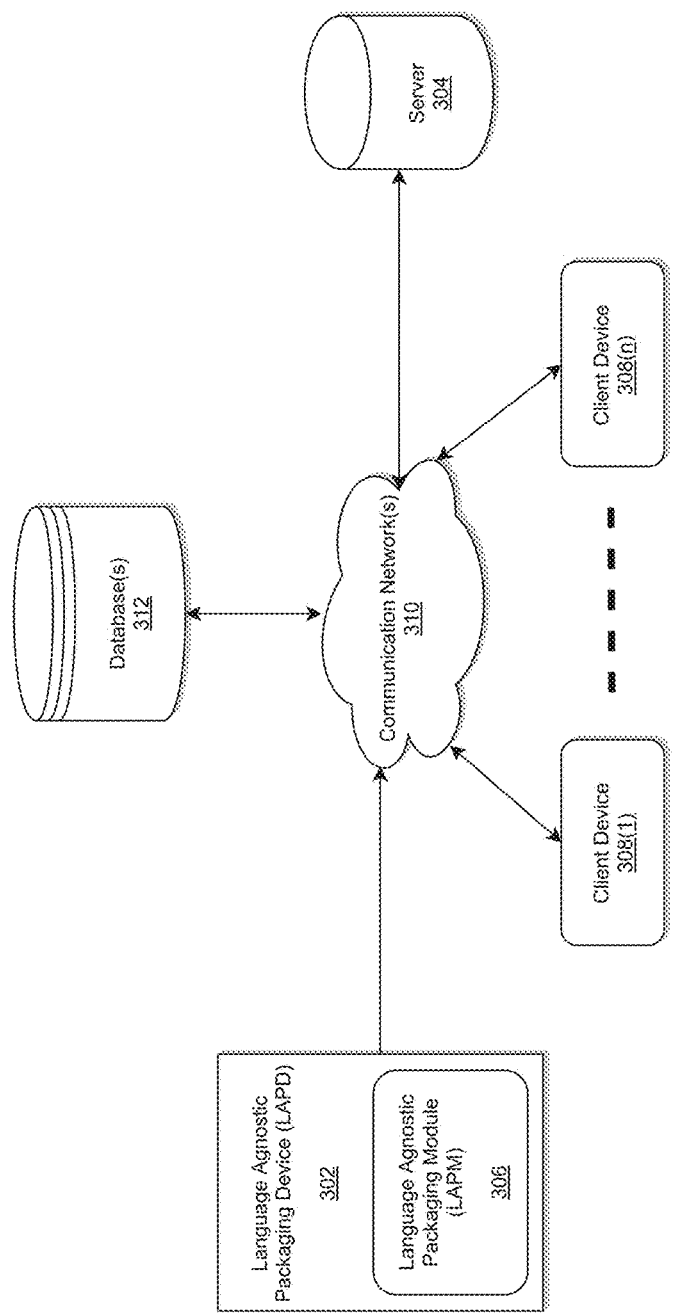
FIG. 3 illustrates a system diagram for implementing a language agnostic packaging device having a language agnostic packaging module in accordance with an exemplary embodiment.

FIG. 3 illustrates a system diagram for implementing a language agnostic packaging device (LAPD) having a language agnostic packaging module (LAPM) in accordance with an exemplary embodiment.

As illustrated in FIG. 3, the system 300 may include a LAPD 302 within which a LAPM 306 is embedded, a server 304, a database(s) 312, a plurality of client devices 308(1) . . . 308(n), and a communication network 310.

According to exemplary embodiments, the LAPD 302 including the LAPM 306 may be connected to the server 304, and the database(s) 312 via the communication network 310. The LAPD 302 may also be connected to the plurality of client devices 308(1) . . . 308(n) via the communication network 310, but the disclosure is not limited thereto.

According to exemplary embodiment, the LAPD 302 is described and shown in FIG. 3 as including the LAPM 306, although it may include other rules, policies, modules, databases, or applications, for example. According to exemplary embodiments, the database(s) 312 may be configured to store ready to use modules written for each API for all environments. The environments, according to exemplary embodiments, may include a plurality of REST resources, Kafka resource, Cassandra resource, relational database resource, etc., but the disclosure is not limited thereto. Although only one database is illustrated in FIG. 3, the disclosure is not limited thereto. Any number of desired databases may be utilized for use in the disclosed invention herein.

According to exemplary embodiments, the LAPM 306 may be configured to receive real-time feed of data from the plurality of client devices 308(1) . . . 308(n) via the communication network 310.

As will be described below, the LAPM 306 may be configured to receive a user request of a process flow corresponding to develop, test, or manage a desired application via a computing device (e.g., one of the plurality of client devices 308(1) . . . 308(n)); access a data source (e.g., database(s) 312)) that stores ready to use modules written for corresponding application programming interface (API) for a plurality of resources to determine what resources are necessary to develop, test, or manage the desired application; create an index file based on the resources accessed from the data source (e.g., database(s) 312)) that are determined to be necessary to develop, test, or manage the desired application, wherein the index file includes details data of how an API is executed; cause a language agnostic packaging platform to receive the index file as input that utilizes the index file to process the user request of the process flow corresponding to develop, test, or manage the desired application; and automatically create, by the language agnostic packaging platform, the desired application as output of the process flow based on the received index file.

The plurality of client devices 308(1) . . . 308(n) are illustrated as being in communication with the LAPD 302. In this regard, the plurality of client devices 308(1) . . . 308(n) may be "clients" of the LAPD 302 and are described herein as such. Nevertheless, it is to be known and understood that the plurality of client devices 308(1) . . . 308(n) need not necessarily be "clients" of the LAPD 302, or any entity described in association therewith herein. Any additional or alternative relationship may exist between either or both of the plurality of client devices 308(1) . . . 308(n) and the LAPD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the LAPD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The LAPD 302 may be the same or similar to the LAPD 202 as described with respect to FIG. 2, including any features or combination of features described with respect thereto.

Figure 4:
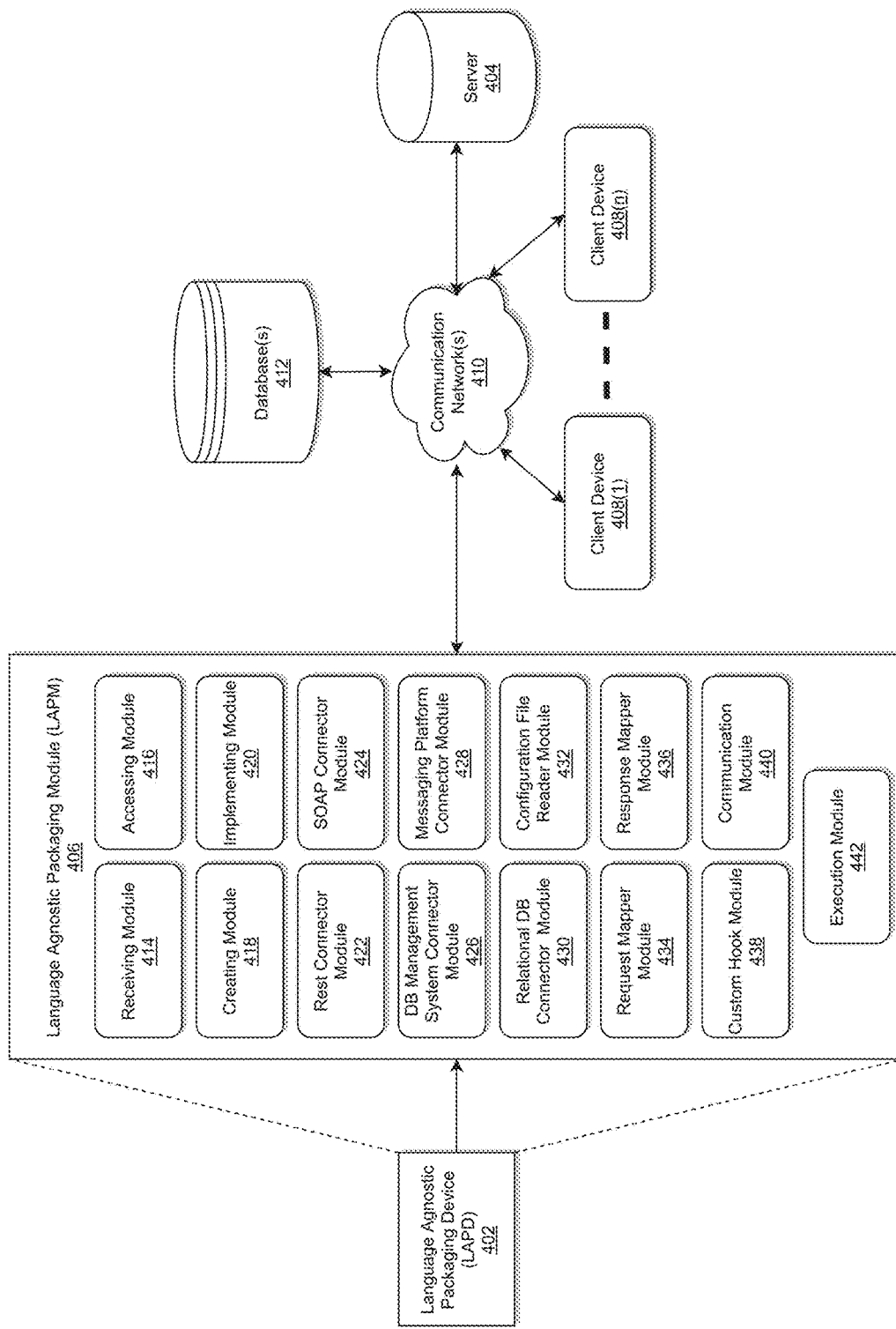
FIG. 4 illustrates a system diagram for implementing a language agnostic packaging module of FIG. 3 in accordance with an exemplary embodiment.

FIG. 4 illustrates a system diagram for implementing an LAPM in accordance with an exemplary embodiment.

According to exemplary embodiments, the system 400 may include an LAPD 402 within which an LAPM 406 is embedded, a server 404, configuration database(s) 408, external resource database(s) 409, and a communication network 410.

According to exemplary embodiments, the LAPD 402 including the LAPM 406 may be connected to the server 404 and the database(s) 412 via the communication network 410. The LAPD 402 may also be connected to the plurality of client devices 408(1)-408(n) via the communication network 410, but the disclosure is not limited thereto. The LAPM 406, the server 404, the plurality of client devices 408(1)-408(n), the database(s) 412, the communication network 410 as illustrated in FIG. 4 may be the same or similar to the LAPM 306, the server 304, the plurality of client devices 308(1)-308(n), the database(s) 312, the communication network 310, respectively, as illustrated in FIG. 3.

According to exemplary embodiments, as illustrated in FIG. 4, the LAPM 406 may include a receiving module 414, an accessing module 416, a creating module 418, an implementing module 420, a rest connector module 422, a SOAP connector module 424, a database management system connector module 426, a messaging platform connector module 428, a relational database connector module 430, a configuration file reader module 432, a request mapper module 434, a response mapper module 436, a custom hook module 438, a communication module 440, and an execution module 442.

According to exemplary embodiments, each of the receiving module 414, accessing module 416, creating module 418, implementing module 420, rest connector module 422, SOAP connector module 424, database management system connector module 426, messaging platform connector module 428, relational database connector module 430, configuration file reader module 432, request mapper module 434, response mapper module 436, custom hook module 438, communication module 440, and the execution module 442 of the LAPM 406 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the receiving module 414, accessing module 416, creating module 418, implementing module 420, rest connector module 422, SOAP connector module 424, database management system connector module 426, messaging platform connector module 428, relational database connector module 430, configuration file reader module 432, request mapper module 434, response mapper module 436, custom hook module 438, communication module 440, and the execution module 442 of the LAPM 406 may be implemented by microprocessors or similar, and may be programmed using software (e.g., microcode) to perform various functions discussed herein and may optionally be driven by firmware and/or software. Alternatively, according to exemplary embodiments, each of the receiving module 414, accessing module 416, creating module 418, implementing module 420, rest connector module 422, SOAP connector module 424, database management system connector module 426, messaging platform connector module 428, relational database connector module 430, configuration file reader module 432, request mapper module 434, response mapper module 436, custom hook module 438, communication module 440, and the execution module 442 of the LAPM 406 may be implemented by dedicated hardware, or as a combination of dedicated hardware to perform some functions and a processor (e.g., one or more programmed microprocessors and associated circuitry) to perform other functions.

According to exemplary embodiments, each of the receiving module 414, accessing module 416, creating module 418, implementing module 420, rest connector module 422, SOAP connector module 424, database management system connector module 426, messaging platform connector module 428, relational database connector module 430, configuration file reader module 432, request mapper module 434, response mapper module 436, custom hook module 438, communication module 440, and the execution module 442 of the LAPM 406 may be called via corresponding API.

Figure 5:
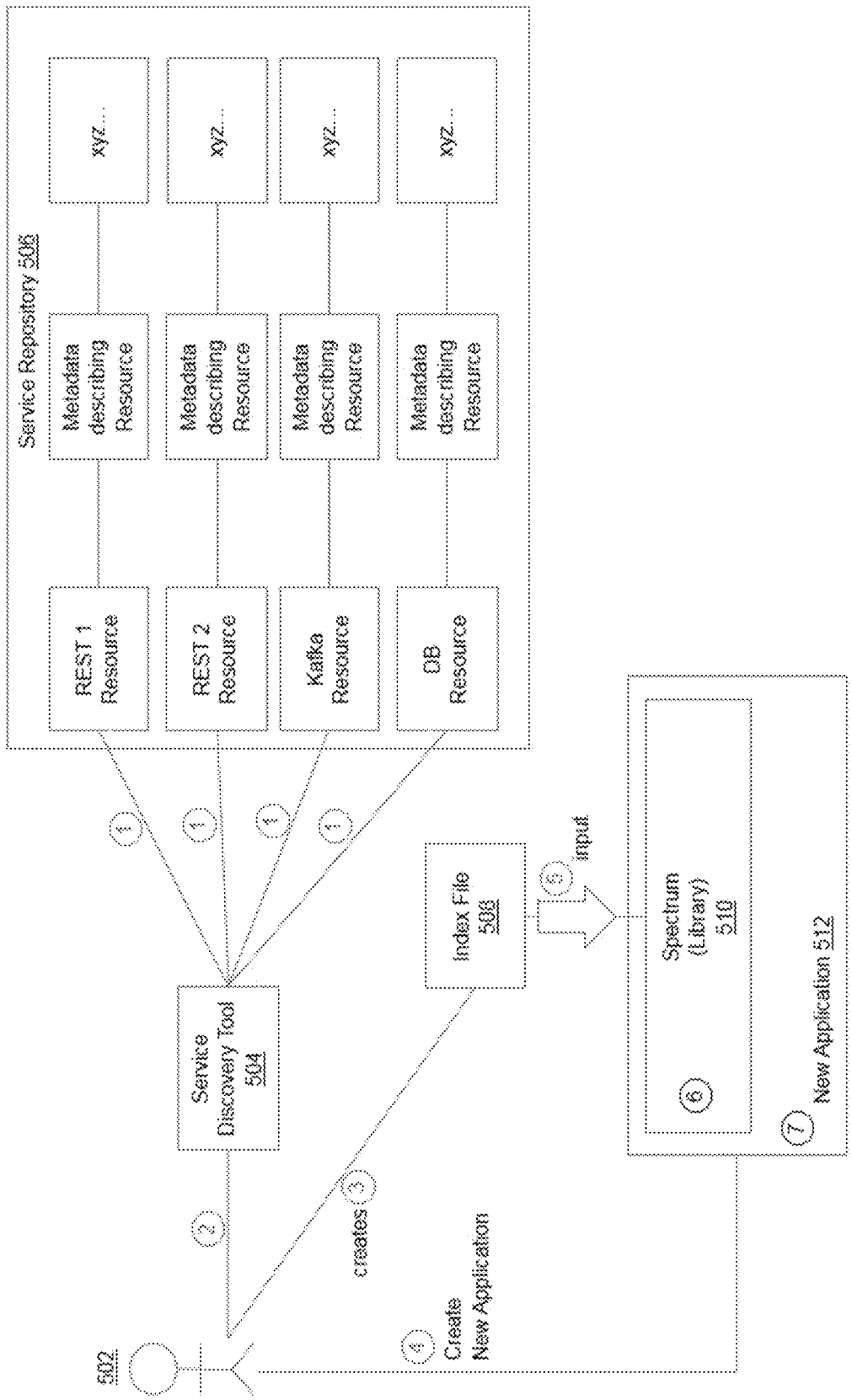
FIG. 5 illustrates an exemplary use case of developing an application by utilizing a language agnostic packaging module of FIG. 4 in accordance with an exemplary embodiment.

FIG. 5 illustrates an exemplary use case of developing an application by utilizing a language agnostic packaging module of FIG. 4 in accordance with an exemplary embodiment. As illustrated in FIG. 5, according to an exemplary use case, the system 500 may include a service discovery tool 500 operatively connected to a service repository 506. The service repository 506 may include information data related to a plurality of resources, e.g., REST 1 resource, REST 2 resource, Kafka resource, database resource, etc., but the disclosure is not limited thereto. For example, information data related to any number of other resources (microservices) may also be stored in the service repository. According to exemplary embodiments, each resource information may include metadata describing the resource.

Referring to FIGS. 4 and 5, according to exemplary embodiment, the receiving module 414 may be configured to receive a user request of a process flow corresponding to develop, test, or manage a desired application from a user 502 via a computing device (e.g., one of the plurality of client devices 408(1)-408(2)).

The accessing module 416 may be configured to access a data source (e.g., the service repository 506) that stores ready to use modules written for corresponding application programming interface (API) for a plurality of resources to determine what resources are necessary to develop, test, or manage the desired application. For example, the service discovery tool 504 may be utilized to use modules written for each API for all environments as illustrated in FIG. 5. The user 502 (e.g., a developer) may utilize the service discovery tool 504 in order to find the necessary resources.

According to exemplary embodiments, the creating module 418 may be configured to create an index file 508 based on the resources accessed from the service repository 506 that are determined to be necessary to develop, test, or manage the desired application. The index file 508 may include details data of how an API is executed. According to exemplary embodiments, the index file 508 may be in any one of the following file formats: index.json, index.xml, and index.yml, but the disclosure is not limited thereto.

Figure 6A:
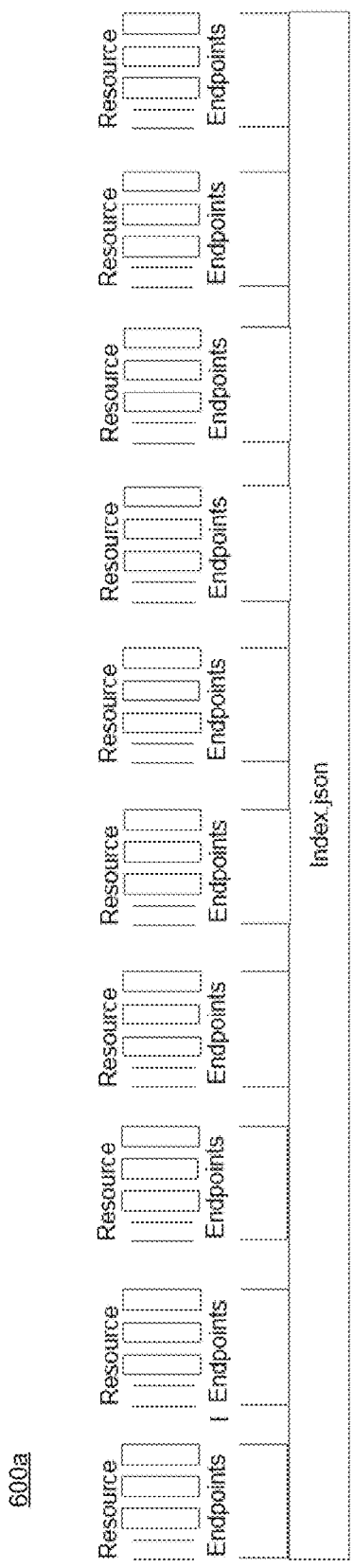
FIG. 6A illustrates an exemplary configuration file created by utilizing a language agnostic packaging module of FIG. 4 in accordance with an exemplary embodiment.

For example, FIG. 6A illustrates an exemplary resource JSON configuration file 600a created by utilizing the LAPM 406 of FIG. 4 in accordance with an exemplary embodiment. As illustrated in FIG. 6A, the indx.json file illustrates a plurality of sources and their associated endpoints.

Figure 6B:
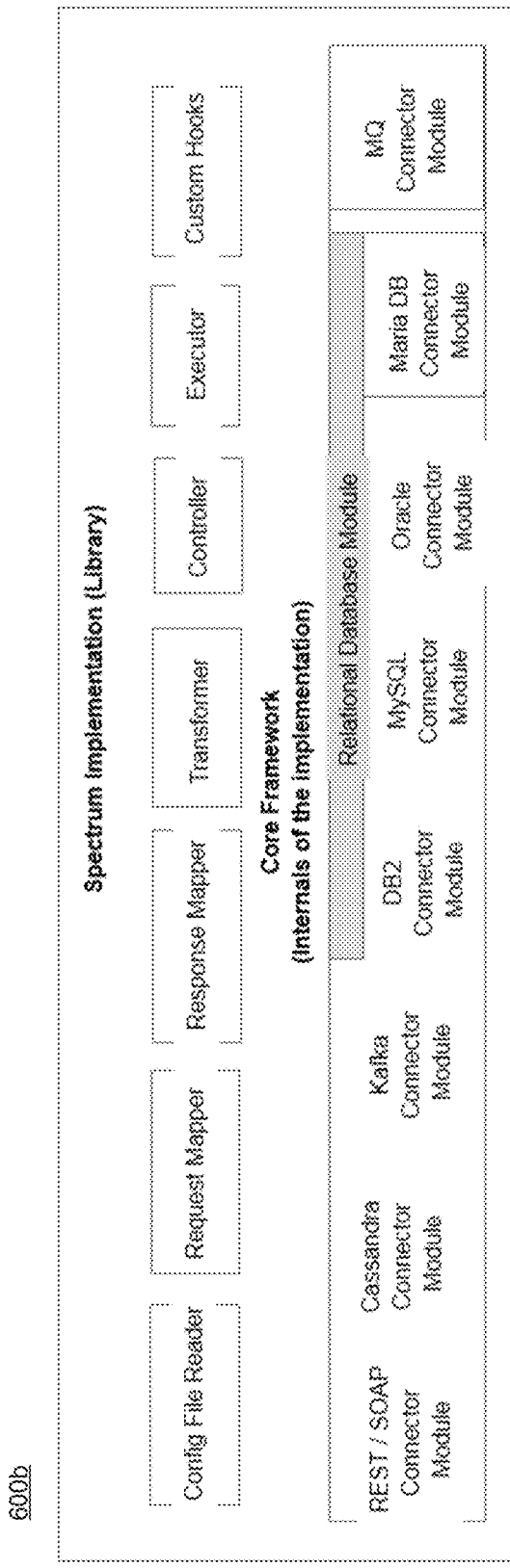
FIG. 6B illustrates an exemplary implementation of a language agnostic packaging module of FIG. 4 in accordance with an exemplary embodiment.

FIG. 6B illustrates an exemplary implementation 600b of the LAPM 406 of FIG. 4 in accordance with an exemplary embodiment where spectrum implementation (library) 510 of FIG. 5 is illustrated in more details. For example, as illustrated in FIG. 6B, the spectrum implementation (library) may include a configuration file reader, a request mapper, a response mapper, a transformer, a controller, an executor, and custom hooks as similarly illustrated in FIG. 4 for the corresponding modules. In addition, as illustrated in FIG. 6B, the exemplary implementation 600b also illustrates core frame (i.e., internals of the implementation) of the LAPM 406. For example, as illustrated in FIG. 6B, the core framework may include, but not limited thereto, REST/SOAP connector module, Cassandra connector module, Kafka connector module, relational database module (which may include, but not limited to, a database2 connector module, MySQL connector module, Oracle connector module) and a MQ connector module similar to those illustrated in FIG. 4.

Referring to FIGS. 4-6B, the LAPM 406 may be configured to causing a language agnostic packaging platform (i.e., spectrum (library) 510) to receive the index file 508 as input that utilizes the index file 508 to process the user request of the process flow corresponding to develop, test, or manage the desired application.

According to exemplary embodiments, the creating module 418 may be configured to automatically create the desired application 512 as output of the process flow based on the received index file 508. The desired application 512 may be a new application which can either be the Spectrum application, or another application that chooses to use Spectrum as a library.

According to exemplary embodiments, the rest connector module 422 may be configured to handle any connectivity to REST APIs, e.g., REST API calls such as GET, POST, DELETE, etc., but the disclosure is not limited thereto According to exemplary embodiments, the SOAP connector module 424 may be configured to handle any connectivity to SOAP APIs, such as any requests that rely on the SOAP protocol.

According to exemplary embodiments, the database management system connector module 426 may be a Cassandra connector module that may be configured to handle any connectivity to Cassandra databases, such as updating, deleting, inserting, reading, etc. from Cassandra databases.

According to exemplary embodiments, the messaging platform connector module 428 may be a Kafka connector module that may be configured to handle any connectivity to Kafka, such as sending messages to Kafka, reading messages from Kafka, etc.

According to exemplary embodiments, the relational database connector module 430 may be configured to handle any connectivity to relational databases.

According to exemplary embodiments, the configuration file reader module 432 may be configured to read the configuration files (e.g., index files) in various formats.

According to exemplary embodiments, the request mapper module 434 may be configured to manipulate the request with available values, such as parsing the data from input request into the specified modules; and allow value substitution into the dependencies.

According to exemplary embodiments, the response mapper module 436 may be configured to re-arrange the output of a process in the desired manner, e.g., altering the output of a given resource.

The transformer as illustrated in FIG. 6B may be configured to transform the overall output from all the executed processes.

The controller as illustrated in FIG. 6B may be configured to provide the interface for user requests, which can also be used as a standalone application.

The execution module (e.g., executor as illustrated in FIG. 6B) may be configured to execute an API. An API may be a command to be executed for getting a desired output). According to exemplary embodiments, all these modules disclosed herein may also be classified as APIs in the framework/platform and the library.

According to exemplary embodiments, the custom hook module 438 may be configured to provide an interface to a user 502 to allow the framework to execute custom code. Custom configuration is performed in the index.json to route the request to a host application (e.g., Template Pattern/ Command Pattern Ex: execute method) that may execute and return the control to Spectrum (library) 510 to continue with request processing. For example, within the index.json, a hook may be implemented to state that at this point the process should take a different path and execute this piece of code and then go back to the process flow again. This way, a user 502 can extract certain aspects of the flow and still leverage what has already been previously done, use less specific keys, or use specific encryption algorithm. That is, a user 502 can deviate from the flow and add his/her custom flow and comeback to the flow again. For example, according to exemplary embodiments, the LAPM 406 may implement the custom hook module 438 within the index file 508; deviate, in response to implementing the custom hook, from the process flow to execute a desired custom code corresponding to develop, test, or manage the desired application and return back to the process flow after execution of the custom code.

FIG. 7 illustrates an exemplary metadata file 700 created by utilizing the LAPM 406 of FIG. 4 in accordance with an exemplary embodiment. Each resource may have its metadata JSON file that describe how to consume the resource.

As illustrated in FIG. 7, in the metadata file 700, "apiname" refers to the name of the API (can be any alphanumeric string); "api" refers to the APIs currently being supported, POST, GET, PUT. DELETE, etc., but the disclosure is not limited thereto (in this exemplary case, it is executing a POST); "dependencies" refers to an API or a set of APIs need to be executed before executing the current API (e.g., if one needs to fetch profile id before fetching account information, the dependencies may create the profile ID which can be utilized to obtain the account information); "url" refers to the endpoint the system is trying to access for the API (in this example, the POST API); "headers" refers to the key-value pairs that need to be passed in for the headers of an API; "body" refers to the key-value pairs that need to be passed in for the body of an API (not required for protocols that don't expect it; e.g., for GET or DELETE requests, there is requirement for a body field because GET and DELETE do not require a body filed. But, if there is a JSON body that needs to be passed on request, a body filed is required for this JSON).

As illustrated in FIG. 7, in the metadata file 700, "pre-condition" refers to a set of key-value pairs, that determines whether the API can be executed or not. For example, if it is desired to conditionally execute a certain API, then this should have values here. For instance, in the example shown in FIG. 7, the pre-condition states that value for dependency1.body.output has to be bigger than the value for dependency2.body.output. So, the system can use this pre-condition filed to modify the application to be allowed, for example, by a specific geographical location, or a country, or a region, such as east coast users, etc., but the disclosure is not limited thereto, which gives a user the ability to narrow down to any specific criteria in developing an application.

As illustrated in FIG. 7, in the metadata file 700, "post-process" refers to a set of key-value pairs that allow a user to modify the output of the API. Similar to pre-condition, there may be certain conditions, if for example, a user wanted to roll out something for high net worth customers, (e.g., if balance is greater than a predetermined threshold), then the user can modify the output of the API accordingly. This way, a user can narrow down the data and provide better ability and usability corresponding to a desired use case.

As illustrated in FIG. 7, in the metadata file 700, "retry" refers to a number that allows for the re-execution of the API in the event of a failure, until the specified threshold is reached.

FIG. 8 illustrates an exemplary index file 800 created by utilizing the LAPM 406 of FIG. 4 in accordance with an exemplary embodiment.

As illustrated in FIG. 8, the "api" refers to the type of API a user is planning to use, POST, GET, PUT, DELETE, etc., but the disclosure is not limited thereto; "processes" refers to the order of execution of the resources; and "post-process" refers to any formatting needs to be executed after executing the processes disclosed above with respect FIGS. 4-6B.

In this example as illustrated in FIG. 8, it is POST API, and all these a.json, b.json, etc. correlate to corresponding resource metadata file. Here processes can be a list and each of these a.json, b.jason, etc. can be a sub-list. This signifies that these a.json, b.json, etc. can be run in parallel. Thus, after running a.json and b.json, then epv.json will run, then c.json will run, etc. There is no need to write any integration code or any modification code to integrate these sub-list processes. For example, if a user want to run db-read.json before a.json, the platform provided by the LAPM 406 allows a user simply to cut and paste db-read.json before a.json. Or, if a user wants to execute db-read.json in parallel with a.json and b.json, then the user may simply paste the db-read.json string in the same sub-list (grouping) as a.json and b.json, thereby significantly reducing complexity in application development, testing, and/or management. For example, the LAPM 406 provides a platform for a user to pick and choose specific sub-list processes to execute a desired process.

According to exemplary embodiments, the LAPM 406 may also be configured to create a user interface (UI) tool as a visible format. For example, each metadata may be represented as a widget and create flow by picking and choosing these widgets.

Figure 9:
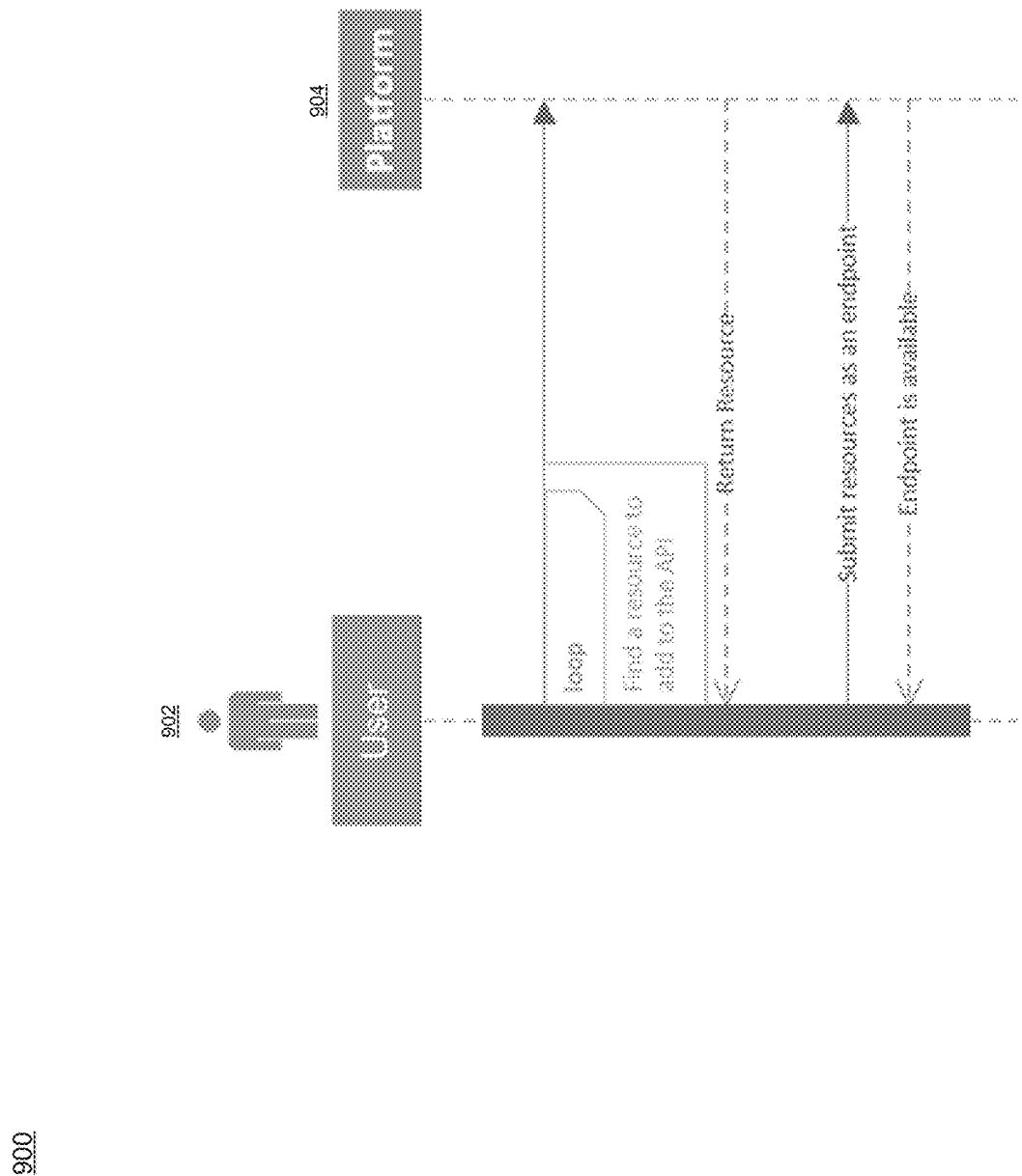
FIG. 9 illustrates an exemplary sequence diagram implemented by a language agnostic packaging module of FIG. 4 from a user point of in accordance with an exemplary embodiment.

FIG. 9 illustrates an exemplary sequence diagram 900 implemented by the LAPM 406 of FIG. 4 as disclosed herein from a user point of in accordance with an exemplary embodiment. For example, the user 902 can request to the platform 904 to find a resource to add to the API. The platform 904 may return the requested resource to the user 902. The user 902 can submit to the platform 904 resources as an endpoint and the platform 904 can send a response to the user 902 that endpoint is available.

Figure 10:
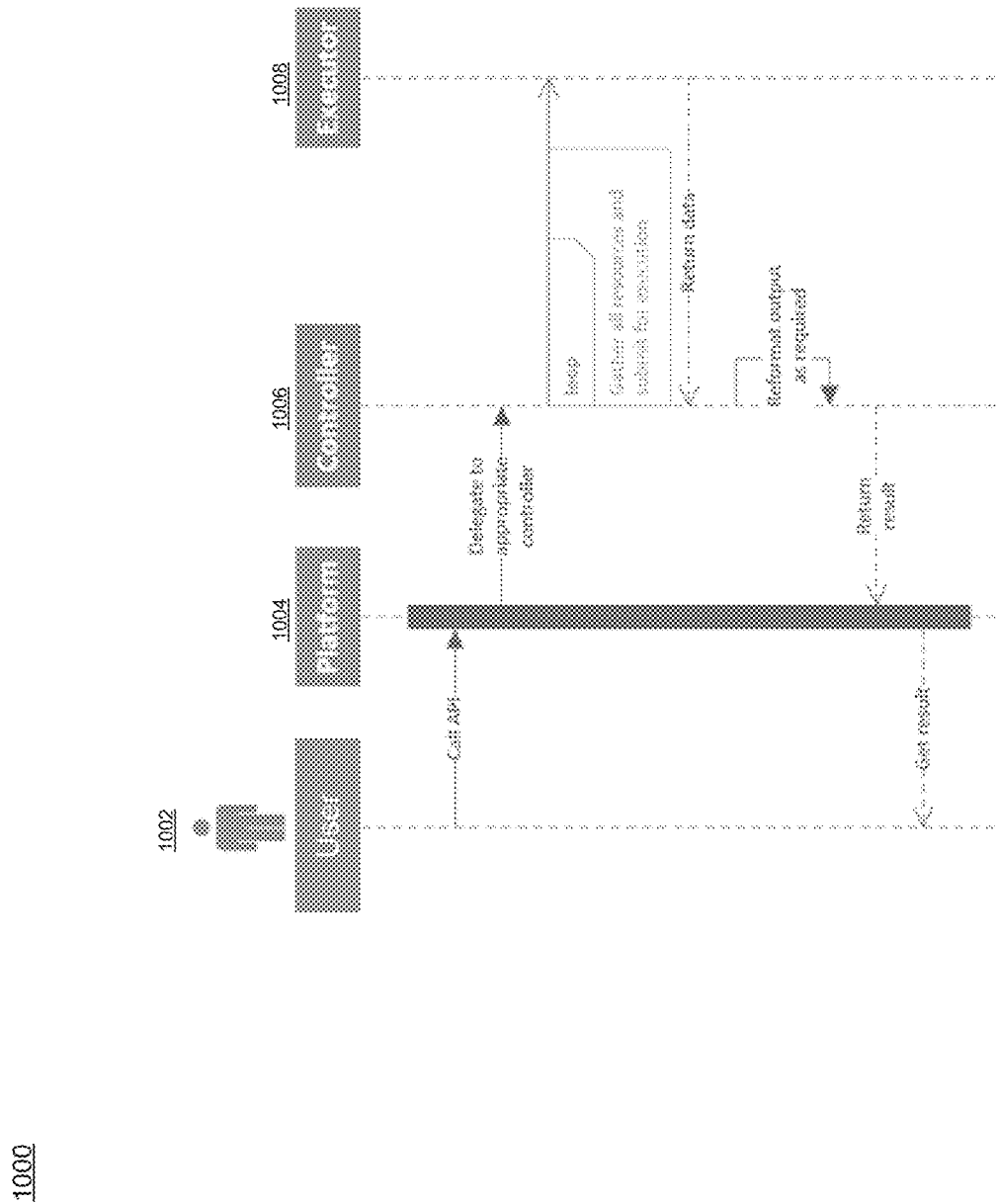
FIG. 10 illustrates another exemplary sequence diagram from a language agnostic packaging module point of in accordance with an exemplary embodiment.

FIG. 10 illustrates another exemplary sequence diagram 1000 implemented by the LAPM 406 of FIG. 4 from the LAPM 406's point of in accordance with an exemplary embodiment. For example, the user 1002 can send a request "call API" to the platform 1004. The platform 1004 can delegate the request to appropriate controller 1006. The controller 1006 gathers all resources and submits for execution to the executor 1008. The executor 1008 returns data to the controller 1006. The controller 1006 then returns results to the platform 1004 and the platform 1004 sends the results to the user 1002.

Figure 11:
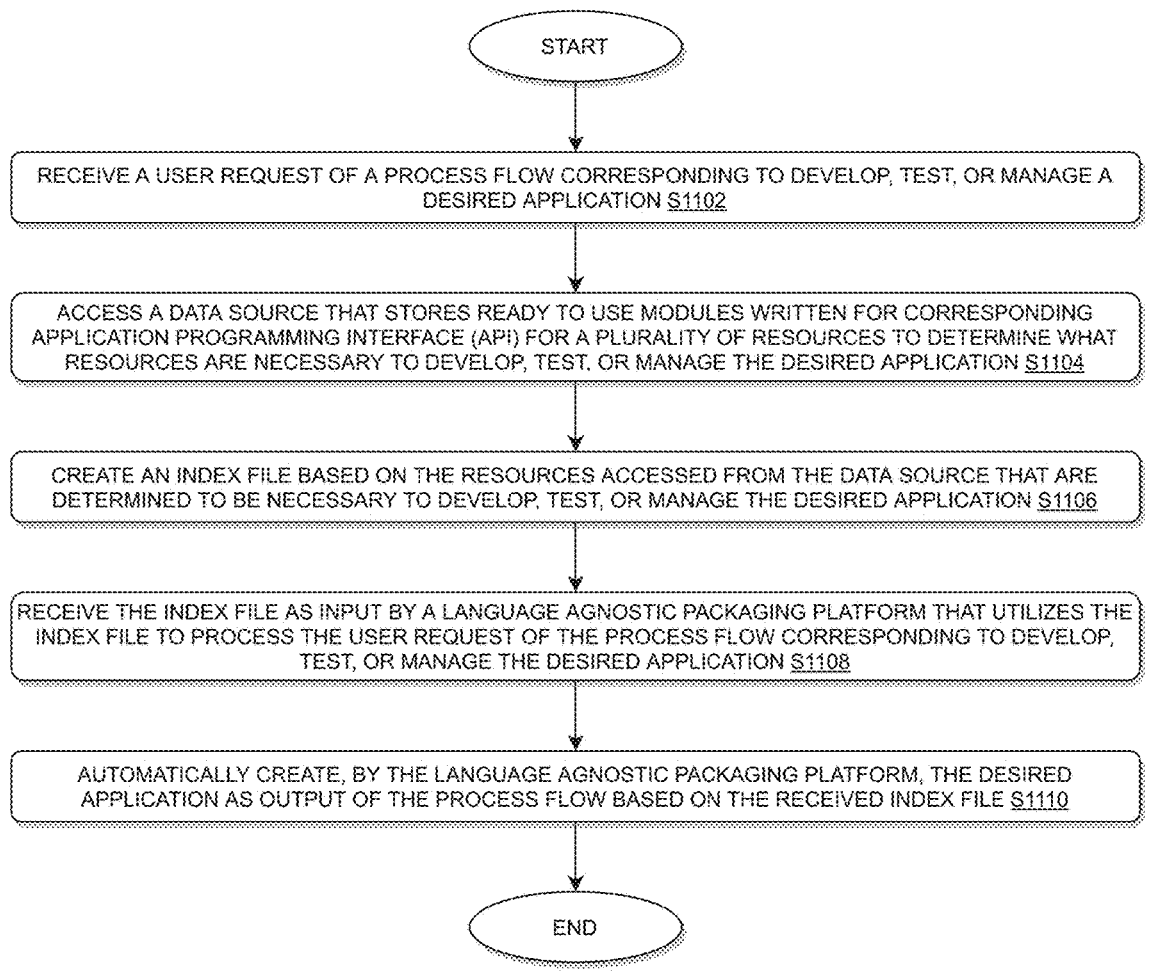
FIG. 11 illustrates a flow chart for implementing a language agnostic packaging module that provides a platform for packaging standalone application modules into re-usable application and infrastructure resources in accordance with an exemplary embodiment.

FIG. 11 illustrates a flow chart for implementing a language agnostic packaging module that provides a platform for packaging standalone application modules into re-usable application and infrastructure resources in accordance with an exemplary embodiment.

As illustrated in FIG. 11, at step 1102, the process 1100 may include receiving a user request of a process flow corresponding to develop, test, or manage a desired application.

At step 1104, the process 1100 may include accessing a data source that stores ready to use modules written for corresponding application programming interface (API) for a plurality of resources to determine what resources are necessary to develop, test, or manage the desired application.

At step 1106, the process 1100 may include creating an index file based on the resources accessed from the data source that are determined to be necessary to develop, test, or manage the desired application, wherein the index file may include details data of how an API is executed.

At step 1108, the process 1100 may include causing a language agnostic packaging platform to receive the index file as input that utilizes the index file to process the user request of the process flow corresponding to develop, test, or manage the desired application.

At step 1110, the process 1100 may include automatically creating, by the language agnostic packaging platform, the desired application as output of the process flow based on the received index file.

According to exemplary embodiments, the process 1100 may further include creating the index file in any one of the following file format: index.json, index.xml, and index.yml, but the disclosure is not limited thereto.

According to exemplary embodiments, the process 1100 may further include: implementing a REST (Representational State Transfer) connector module configured to process connectivity to REST APIs, implementing a SOAP (Simple Object Access Protocol) connector module configured to process connectivity to SOAP APIs, implementing a Cassandra connector module, implementing a Kafka connector module, implementing a relational database connector module, implementing a configuration file reader configured to read the index file in various formats, implementing a request mapper module configured to manipulate the received user request with available values, implementing a response mapper module configured to rearrange the output of the process flow in a desired manner and alter the output of the process flow for a given resource.

According to exemplary embodiments, the process 1100 may further include: implementing a custom hook module within the index file; deviating, in response to implementing the custom hook, from the process flow to execute a desired custom code corresponding to develop, test, or manage the desired application; and returning back to the process flow after execution of the custom code.

According to exemplary embodiments, the LAPD 402 may include a memory (e.g., a memory 106 as illustrated in FIG. 1) which may be a non-transitory computer readable medium that may be configured to store instructions for implementing an LAPM 406 for packaging standalone application modules into re-usable application and infrastructure resources as disclosed herein. The LAPD 402 may also include a medium reader (e.g., a medium reader 112 as illustrated in FIG. 1) which may be configured to read any one or more sets of instructions, e.g., software, from any of the memories described herein. The instructions, when executed by a processor embedded within the LAPM 406 or within the LAPD 402, may be used to perform one or more of the methods and processes as described herein. In a particular embodiment, the instructions may reside completely, or at least partially, within the memory 106, the medium reader 112, and/or the processor 104 (see FIG. 1) during execution by the LAPD 402.

According to exemplary embodiments, the instructions, when executed, may cause a processor embedded within the LAPM 406 or the LAPD 402 to perform the following: causing a receiver to receive a user request of a process flow corresponding to develop, test, or manage a desired application; accessing a data source that stores ready to use modules written for corresponding application programming interface (API) for a plurality of resources to determine what resources are necessary to develop, test, or manage the desired application; creating an index file based on the resources accessed from the data source that are determined to be necessary to develop, test, or manage the desired application, wherein the index file includes details data of how an API is executed; causing a language agnostic packaging platform to receive the index file as input that utilizes the index file to process the user request of the process flow corresponding to develop, test, or manage the desired application; and automatically creating, by the language agnostic packaging platform, the desired application as output of the process flow based on the received index file. The processor may be the same or similar to the processor 104 as illustrated in FIG. 1 or the processor embedded within LAPD 202, LAPD 302, LAPD 402, and LAPM 406.

According to exemplary embodiments, the instructions, when executed, may further cause the processor 104 to perform the following: creating the index file in any one of the following file format: index.json, index.xml, and index.yml, but the disclosure is not limited thereto.

According to exemplary embodiments, the instructions, when executed, may further cause the processor 104 to perform the following: implementing a REST (Representational State Transfer) connector module configured to process connectivity to REST APIs, implementing a SOAP (Simple Object Access Protocol) connector module configured to process connectivity to SOAP APIs, implementing a Cassandra connector module, implementing a Kafka connector module, implementing a relational database connector module, implementing a configuration file reader configured to read the index file in various formats, implementing a request mapper module configured to manipulate the received user request with available values, implementing a response mapper module configured to rearrange the output of the process flow in a desired manner and alter the output of the process flow for a given resource.

According to exemplary embodiments as disclosed above in FIGS. 1-11, technical improvements effected by the instant disclosure may include a platform for packaging standalone application modules into re-usable application and infrastructure resources, but the disclosure is not limited thereto. For example, according to exemplary embodiments as disclosed above in FIGS. 1-11, technical improvements effected by the instant disclosure may include a platform that may also provide optimized processes of implementing a language agnostic packaging module for separating each of these application and infrastructure resource components into a configuration, which can be linked together by the language agnostic packaging module to allow for consistent easy orchestration and passing of data through the components to output a desired result. Since the disclosed process, according to exemplary embodiments, is language agnostic, the language agnostic packaging module/platform may be independently tuned or modified for optimal performance without affecting the configuration files, thereby allowing full backward compatibility and minimizing overhead for development teams and allowing automated development and testing of an application without requiring to write any code.

According to exemplary embodiments as disclosed above in FIGS. 1-11, the following non-limiting technical improvements may be effected by the instant disclosure: Simple—a developer/user doesn't need anything more than the bare necessities to describe the usage of an API; Featherweight—unlike conventional solutions that offer such functionality with a lot of ceremony, by implementing the LAPM as disclosed herein, a user just need to know the details of the API and the order the user needs to call it; Language Agnostic—the LAPM as disclosed herein can be implemented in any language; Platform Agnostic—the LAPM as disclosed herein can be written to run on any platform; Performant—performance is generally based on the knowledge of the programmer, here the platform provided by the LAPM is optimized, thereby allowing a developer/user to be more concerned about functionality rather than spending his/her limited time on optimizing performance, and thereby maintaining a very low memory footprint; Rules—the LAPM as disclosed herein allows for simple rules that define when an API is executed; Standards based—the resource files can be constructed using firm wide language; Consistent—the resource files will be used in a predictable manner, allowing users to change languages, or make other improvements without affecting the resources/applications; Rapid Development—developers/users can get an application running more quickly because they do not have to write integration code, and can restructure the configuration without impacting the whole application, but the disclosure is not limited thereto.

According to exemplary embodiments as disclosed above in FIGS. 1-11, the following non-limiting technical improvements may also be effected by the instant disclosure: Rapid Prototyping—developers/users can choose to have their API deployed to an existing service, so they can get rapid feedback; Automation—standardized resources allow users to automate integration/performance tests; Integration Testing—standardized resources allow users to create stubs for the developer/user to till in the appropriate values; Less Integration Code—developers/users would not have to write custom integration code to wire up the functionality; No POJO (Plain Old Java Object) Code Needed—developers/users would not be required to write basic repetitive code; No Service Code Needed—developers/users would not be required to write repetitive code to connect to resources; Highly Configurable—the disclosed processes can be used as a platform or a library; Highly Extensible—this platform can be easily extended with modules or via the host application; TTM (Total Time to Market)—the combination of features in the platform greatly reduces the TTM; and Agile/Lean—completely supports the agile and lean development methodology, to make changes in sprint without major effort, but the disclosure is not limited thereto.

According to exemplary embodiments as disclosed above in FIGS. 1-11, the following non-limiting technical improvements may also be effected by the instant disclosure: connecting to EPV resources to retrieve passwords; creating a unified interface for a wide variety of resources; transferring data between APIs without code; executing any of these resources in any order without code; enabling parallelism without re-architecting the application or changing code; ability to understand what a resource is doing without having to dig through code; ability to understand how an API is utilizing resources without having to dig through code; ability to restructure resources without worrying about the entire application; ability to restructure an API without worrying about the entire application; ability to introduce new APIs using the same resources without duplicating code; ability to localize failures to resources/APIs without affecting the entire application.

According to exemplary embodiments as disclosed above in FIGS. 1-11, the LAPM disclosed herein may support the following: integrate into a Service Discovery—build a repository of "resources" so developers/users have a one-stop shop to create an API; enhancing the framework to support YAML, XML, TOML etc.; WYSIWYG editor—drag and drop resources in order to create an API, generate well-formed and validated configuration files in supported formats (e.g., YAML, XML, etc.); support any distributed/remote/local resource accessible via industry supported protocols like HTTP, TCP/IP, AMQP, etc. —Kafka, MQ, Other Types of Databases like Graph DB, etc.; No SQL Databases (e.g., Mongo DB); support re-usable modules so the required functionality can be embedded in any application in any languages; optimize the performance.

According to exemplary embodiments as disclosed above in FIGS. 1-11, the LAPM disclosed herein may support the following: add custom hooks—custom configuration in the index json to route the request to the host application that will execute and return the control to Spectrum to continue with request processing; add telemetry and observability; offer a platform where APIs are available soon as a developer/user creates them with the WYSIWYG editor; generate Cucumber test stubs from given API definition; offer the platform in multiple languages.

According to exemplary embodiments, the LAMP as disclosed herein with reference to FIGS. 1-11 may provide the following additional benefits compared to conventional systems and methods: GUI is used to simplify the creation of readable configuration files; can be embedded in an application, allowing it to be deployed via conventional means and can be tailored to the specifications of any environment; can test individual resources and APIs; conducive to agile methodology, as each resource can be developed independently and shared across multiple applications; simple to understand by any developer/user who understands JSON; or any other chosen configuration format; supports integration/performance testing by providing stubs allowing developers to input appropriate values, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing a language agnostic packaging platform by utilizing one or more processors and one or more memories, the method comprising:
   receiving a user request of a process flow corresponding to develop, test, or manage a desired application;
   accessing a data source that stores ready to use modules written for corresponding application programming interface (API) for a plurality of resources to determine what resources are necessary to develop, test, or manage the desired application;
   creating an index file based on the resources accessed from the data source that are determined to be necessary to develop, test, or manage the desired application, wherein the index file includes details data of how an API is executed;
   causing a language agnostic packaging platform to receive the index file as input that utilizes the index file to process the user request of the process flow corresponding to develop, test, or manage the desired application; and
   automatically creating, by the language agnostic packaging platform, the desired application as output of the process flow based on the received index file.

2. The method according to claim 1, further comprising: creating the index file in any one of the following file formats: index.json, index.xml, and index.yml.

3. The method according to claim 1, wherein the ready to use modules include one or more of the following modules: a REST (Representational State Transfer) connector module configured to process connectivity to REST APIs, a SOAP (Simple Object Access Protocol) connector module configured to process connectivity to SOAP APIs, a Cassandra connector module, a Kafka connector module, a relational database connector module, a configuration file reader configured to read the index file in various formats.

4. The method according to claim 1, further comprising: implementing a request mapper module configured to manipulate the received user request with available values.

5. The method according to claim 1, further comprising: implementing a response mapper module configured to rearrange the output of the process flow in a desired manner.

6. The method according to claim 5, further comprising: altering the output of the process flow for a given resource.

7. The method according to claim 1, further comprising: implementing a custom hook module within the index file;
   deviating, in response to implementing the custom hook, from the process flow to execute a desired custom code corresponding to develop, test, or manage the desired application; and
   returning back to the process flow after execution of the custom code.

8. The method according to claim 1, wherein each resource includes its own meta-data file that describes how to consume the resource.

9. A system for implementing a language agnostic packaging platform, the system comprising:
   a receiver that receives a user request of a process flow corresponding to develop, test, or manage a desired application;
   a data source that stores ready to use modules written for corresponding application programming interface (API) for a plurality of resources; and a processor coupled to the receiver and the data source via a communication network, wherein the processor is configured to:
- access the data source to obtain the ready to use modules written for corresponding application programming interface (API) for the plurality of resources to determine what resources are necessary to develop, test, or manage the desired application;
- create an index file based on the resources accessed from the data source that are determined to be necessary to develop, test, or manage the desired application, wherein the index file includes details data of how an API is executed;
- causing a language agnostic packaging platform to receive the index file as input that utilizes the index file to process the user request of the process flow corresponding to develop, test, or manage the desired application; and
- automatically create, by the language agnostic packaging platform, the desired application as output of the process flow based on the received index file.

10. The system according to claim 9, wherein the processor is further configured to:
create the index file in any one of the following file formats: index.json, index.xml, and index.yml.

11. The system according to claim 9, wherein the ready to use modules include one or more of the following modules: a REST (Representational State Transfer) connector module configured to process connectivity to REST APIs, a SOAP (Simple Object Access Protocol) connector module configured to process connectivity to SOAP APIs, a Cassandra connector module, a Kafka connector module, a relational database connector module, a configuration file reader configured to read the index file in various formats.

12. The system according to claim 9, wherein the processor is further configured to:
implement a request mapper module configured to manipulate the received user request with available values.

13. The system according to claim 9, wherein the processor is further configured to:
implement a response mapper module configured to rearrange the output of the process flow in a desired manner.

14. The system according to claim 13, wherein the processor is further configured to:
alter the output of the process flow for a given resource.

15. The system according to claim 9, wherein the processor is further configured to:
- implement a custom hook module within the index file;
- deviate, in response to implementing the custom hook, from the process flow to execute a desired custom code corresponding to develop, test, or manage the desired application; and
- return back to the process flow after execution of the custom code.

16. The system according to claim 9, wherein each resource includes its own meta-data file that describes how to consume the resource.

17. A non-transitory computer readable medium configured to store instructions for implementing a language agnostic packaging platform, wherein, when executed, the instructions cause a processor to perform the following:
- causing a receiver to receive a user request of a process flow corresponding to develop, test, or manage a desired application;
- accessing a data source that stores ready to use modules written for corresponding application programming interface (API) for a plurality of resources to determine what resources are necessary to develop, test, or manage the desired application;
- creating an index file based on the resources accessed from the data source that are determined to be necessary to develop, test, or manage the desired application, wherein the index file includes details data of how an API is executed;
- causing a language agnostic packaging platform to receive the index file as input that utilizes the index file to process the user request of the process flow corresponding to develop, test, or manage the desired application; and
- automatically creating, by the language agnostic packaging platform, the desired application as output of the process flow based on the received index file.

18. The non-transitory computer readable medium according to claim 17, wherein, when executed, the instructions further cause the processor to perform the following:
creating the index file in any one of the following file format: index.json, index.xml, and index.yml.

19. The non-transitory computer readable medium according to claim 17, wherein, when executed, the instructions further cause the processor to perform the following:
- implementing a custom hook module within the index file;
- deviating, in response to implementing the custom hook, from the process flow to execute a desired custom code corresponding to develop, test, or manage the desired application; and
- returning back to the process flow after execution of the custom code.

20. The non-transitory computer readable medium according to claim 17, wherein each resource includes its own meta-data file that describes how to consume the resource.

* * * * *